United States Patent [19]

Lampe et al.

[11] Patent Number: 5,184,458
[45] Date of Patent: Feb. 9, 1993

[54] POWER UNIT FUEL PRESSURIZATION SYSTEM

[76] Inventors: Steven W. Lampe, 4860 Lorraine Dr., San Diego, Calif. 92115; Malcolm J. McArthur, 13821 Davenport Ave., San Diego, Calif. 92129

[21] Appl. No.: 439,684

[22] Filed: Nov. 21, 1989

[51] Int. Cl.[5] .................................................. F02C 7/26
[52] U.S. Cl. .............................. 60/39.142; 60/39.15; 60/727
[58] Field of Search ............ 60/39.141, 39.142, 39.21, 60/39.27, 246, 727, 728, 39.163, 39.15, 39.33

[56] References Cited

U.S. PATENT DOCUMENTS

| | | | |
|---|---|---|---|
| 3,098,626 | 7/1963 | Messinger | 60/39.142 |
| 3,965,673 | 6/1976 | Friedrich | 60/39.142 |
| 4,514,976 | 5/1985 | Christoff | 60/39.15 |
| 4,542,722 | 7/1985 | Reynolds | 60/39.142 |
| 4,684,081 | 8/1987 | Cronin | 60/39.141 |
| 4,759,178 | 7/1988 | Joy | 60/39.142 |
| 4,864,812 | 9/1989 | Rodgers | 60/39.15 |

FOREIGN PATENT DOCUMENTS 48611 11/1986 European Pat. Off. ......... 60/39.142

*Primary Examiner*—Richard A. Bertsch
*Assistant Examiner*—Michael I. Kocharov
*Attorney, Agent, or Firm*—Antonelli, Terry, Stout & Kraus

[57] ABSTRACT

A power generating unit in accordance with the present invention comprises a pressurized gas source (44) providing pressurized gas containing oxygen to be used in combustion of a fuel; a combustor (42) for providing pressurized gas produced by combustion of a mixture of the pressurized gas provided to the combustor by the pressurized gas source and fuel provided to the combustor by a fuel supply (48); a first turbine (68) driven by pressurized gas produced by the combustor; a gear box (70) driven by the turbine having an output shaft (72); a fuel pump (46) disposed within the fuel supply having a pair of input shafts (64 and 76) for providing pressurized fuel to the combustor in response to rotation of either of the input shafts; a motor (58) coupled to the pressurized gas source having a drive shaft (60) which rotates in response to the pressurized gas applied from the gas source; and a coupling mechanism (62 and 74), coupled to the shafts, for applying driving torque to the fuel pump during rotation of the pressurized gas to the combustor from the input shaft which is rotating at a higher velocity.

32 Claims, 4 Drawing Sheets

POWER UNIT FUEL PRESSURIZATION SYSTEM

DESCRIPTION

1. Technical Field

The present invention relates to fuel supplies for emergency power units (EPU), integrated power units (IPU) and auxiliary power units (APU) for use in airframes.

2. Background Art

EPUs are power generators used for generating emergency power in airframes. EPUs have been developed in recent years which generate power by combusting jet fuel which is oxidized within a combustor by pressurized air blown down from a high pressure air supply. The high pressure gas stream produced by combustion in the combustor is directed to a turbine. Shaft output power from the turbine is applied to a gear box which drives one or more power generators which may be electrical, hydraulic or a combination of electrical and hydraulic power generators. An APU is a turbine which utilizes atmospheric air to provide auxiliary electrical and/or hydraulic power to the airframe on the ground or in the air. When a propulsion jet engine flames out at high altitudes at which insufficient atmospheric air exists for starting of an auxiliary power unit (APU), the EPU is used to provide emergency auxiliary electrical and hydraulic power for maintaining control of the airframe. An IPU is an integrated power generating system which performs the functions of both an EPU and an APU.

In order to properly initiate combustion within the combustor of an EPU, it is necessary to provide pressurized fuel to one or more fuel injectors within the combustor at the time of applying an ignition spark to the combustor. Several designs have been utilized in the prior art. A gear box driven fuel pump may be utilized to provide the pressurized fuel to the combustor if sufficient power exists. The problem with this solution is that it requires a prime mover to rotate the gear box driving the fuel pump to a velocity sufficient for the fuel pump to supply the pressurized fuel which represents a weight penalty to the operation of the airframe.

FIG. 1 illustrates a first prior art APU/EPU combining EPU and APU functions which are connected by a common gear box. Pressurized fuel for the EPU combustor is provided by an electric motor which drives a fuel pump contained in a fuel supply. Pressurized fuel for the APU combustor is provided by the fuel pump. The EPU combustor supplies pressurized combustion gases to the EPU turbine. The APU drives the hydraulic pump and generator by torque transmitted through the gear box to provide auxiliary hydraulic and/or electrical power.

FIG. 2 illustrates a second prior art APU/EPU combining EPU and APU functions which are connected by a common gear box. Initial pressurized fuel is provided to the EPU combustor by a fuel accumulator containing JP 4 jet fuel. Pressurized fuel for the APU combustor is provided by the fuel accumulator. High pressure air is blown down to the fuel accumulator to provide energy for forcing fuel from the fuel accumulator to the fuel injector of the EPU combustor and the fuel injector of the APU combustor. The valves respectively between the air supply and the fuel accumulator, the air supply and the atmosphere (vent) and the series valves between the fuel accumulator and the combustors are opened when each of the combustors is to be lit. A fuel pump is driven by the gear box for supplying pressurized fuel to the injectors of the combustors associated with the EPU and APU during operation of the EPU after rotation of the EPU and APU turbines reaches sufficient velocity. The opening of control valves between the pressurized air supply and the accumulator and between the accumulator and the combustors permits the pressurized fuel to flow initially to the injector of the combustors to initiate combustion prior to the turbine associated with the EPU or APU reaching self sustaining speed. After reaching self sustaining speed the aforementioned valves may be closed with the necessary pressure head for supplying pressurized fuel to the combustor of the EPU or APU being provided by the fuel pump driven through torque transmitted from the EPU or APU turbines through the gear box to the fuel pump.

"Black start" starting of turbines is starting produced without external electrical excitation such as from a battery or an electrical generator. Black start starting is produced by driving an electrical permanent magnet generator to produce electrical excitation from a power takeoff from the turbine rotor with the only energy source required for black starting being a torque source for driving the turbine rotor.

Tow spool turbines are known. A two shaft turbine has a gas generator spool mounted on a first shaft which combusts gas in a combustor to produce a high pressure gas stream which impinges on a spool mounted on a second shaft. A split shaft turbine has a high pressure and a low pressure spool. The gas generator of the two shaft turbine contains a gear box that drives a fuel pump for pressurizing fuel supplied to the combustor. The high pressure spool of the split shaft contains a gear drive that drives a fuel pump for pressurizing fuel supplied to the combustor. The gear box represents a weight and volume penalty for an airframe containing the turbine.

U.S. Pat. No. 2,643,511 discloses an engine starter for a jet engine which pumps jet fuel with a fuel pump driven by stored oxygen used in the starting process.

DISCLOSURE OF THE INVENTION

The present invention provides a power generating unit for use in airframes which is lighter in weight than the prior art and is effective in providing pressurized fuel to a combustor associated with an EPU, APU or IPU. The invention also provides an electrical power generating unit for generating electrical power for black starting of a turbine which utilizes a lightweight permanent magnet generator PMG which is driven by high pressure gas blown from a gas storage vessel which may also be utilized in providing pressurized fuel to a combustor associated with an EPU, APU or IPU. The invention may also be used to provide pressurized fuel to a combustor of a gas generator in a two shaft or split shaft turbine in an APU or other applications which is powered by high pressure gas blown down from a gas storage vessel which may also be utilized in providing pressurized fuel to a combustor associated with an EPU. The invention may be used to drive any driven element by high pressure gas blown down from a gas storage vessel. Finally, the invention may be practiced by replacing an air motor which drives one of the shaft inputs to the driven element with another prime mover such as an electric motor or hydraulic motor.

The invention utilizes a gas driven motor which is powered by air blown down from a pressurized stored gas vessel, also used for providing pressurized gas containing oxygen to support combustion in a combustor, for supplying torque to a fuel pump and/or electrical power generator until an output from a gear box driven by a turbine driven by high pressure gas from the combustor reaches a velocity greater than the rotational velocity of the drive shaft of the gas driven motor. Thereafter, the drive shaft of the gas driven motor is automatically decoupled by a suitable mechanical linkage such as an overrunning clutch and pressurized air is disconnected from the air motor by closing of a suitable valve.

A power generating unit for supplying to an airframe at least emergency power to a load in accordance with the invention includes a pressurized gas source providing pressurized gas containing oxygen to be used in combusting a fuel; a combustor for providing pressurized gas produced by combustion of a mixture of the pressurized gas provided to the combustor by the pressurized gas source and fuel provided to the combustor by a fuel supply; a first turbine driven by pressurized gas produced by the combustor; a gear box driven by the turbine having an output shaft; a pair of input shafts directly connected to a fuel pump comprising the load disposed within the fuel supply having a pair of input shafts for providing pressurized fuel to the combustor in response to rotation of either of the input shafts; a motor coupled to the pressurized gas source having a drive shaft which rotates in response to pressurized gas supplied from the gas source; and a coupling mechanism, coupled to the output and drive shafts, for applying driving torque to the fuel pump during application of pressurized gas to the combustor from the output or drive shaft which is rotating at a higher velocity. The coupling mechanism comprises a first overrunning clutch coupled to the output shaft and one of the input shafts; and a second overrunning clutch coupled to the drive shaft and another of the input shafts. The motor has a rated operating rotational speed in driving the fuel pump in response to the stored pressurized gas which is less than the rotational velocity at which the output shaft drives the fuel pump when the first turbine is producing full output power. The first turbine may be part of an emergency power unit. The load further comprises a self-excited electrical generator, driven from the input shaft which is rotating at a higher velocity by the coupling mechanism, for providing electrical power for use in starting the turbine. The electrical generator may be a permanent magnet generator.

A power generating unit for supplying to an airframe at least emergency power to a load in accordance with the invention includes a pressurized gas source providing pressurized gas containing oxygen to be used in combusting of fuel; a combustor for providing pressurized gas produced by combustion of a mixture of the pressurized gas provided to the combustor by the pressurized gas source and fuel provided to the combustor by a fuel supply; a first turbine driven by pressurized gas produced by the combustor; a gear box driven by the turbine having an output shaft; a fuel pump and a self-excited electrical generator comprising the load for providing an output utilized in operation of the turbine in response to rotation of either of the input shafts: a motor coupled to the pressurized gas source having a drive shaft which rotates in response to pressurized gas supplied from the gas source; and a mechanism, coupled to the shafts, for applying driving torque to the driven element during application of pressurized gas to the combustor from the output or drive shaft which is rotating at a higher velocity. The mechanism comprises a first overrunning clutch coupled to the output shaft and one of the input shafts; and a second overrunning clutch coupled to the drive shaft and another of the input shafts. The motor has a rated operating rotational speed in driving the driven element in response to the stored pressurized gas which is less than the rotational velocity at which the output shaft drives the driven element when the first turbine is producing full output power.

A power generating unit for supplying to an airframe at least emergency power to a load in accordance with the invention includes a pressurized gas source providing pressurized gas containing oxygen to be used in combusting of fuels; a combustor for providing pressurized gas produced by combustion of a mixture of the pressurized gas provided to the combustor by the pressurized gas source and fuel provided to the combustor by the fuel supply; a first turbine driven by pressurized gas produced by the combustor; a gear box driven by the turbine having self-excited output shaft; a pair of input shafts directly connected to an electrical generator comprising the load for providing electrical power in response to rotation of either of the input shafts for use in starting the turbine; a motor coupled to the pressurized gas source having a drive shaft which rotates in response to pressurized gas supplied from the gas source; and a mechanism, coupled to the shafts, for applying driving torque to the generator during application of pressurized gas to the combustor from the output or drive shaft which is rotating at a higher velocity. The mechanism for applying driving torque comprises a first overrunning clutch coupled to the output shaft in one of the input shafts; and a second overrunning clutch coupled to the drive shaft and another of the input shafts; and wherein the electrical power generator is a permanent magnet generator. The motor has a rated operating rotational speed in driving the electrical generator in response to the stored pressurized gas which is less than the rotational velocity at which the output shaft drives the electrical generator when the first turbine is producing full output power.

A power generating unit for supplying to an airplane at least emergency power to a load in accordance with the invention includes a pressurized gas source providing pressurized gas containing oxygen to be used in combusting a fuel; a first spool and a combustor for providing pressurized gas produced by combustion of a mixture of the pressurized gas provided to the combustor by the pressurized gas source in fuel provided to the combustor by the fuel supply; a second spool driven by pressurized gas produced by the combustor; a gear box having an output shaft driven by one of the spools; a pair of input shafts directly connected to a fuel pump comprising the load disposed within the fuel supply for providing pressurized fuel to the combustor in response to rotation of either of the input shafts; a motor coupled to the pressurized gas source having a drive shaft which rotates in response to pressurized gas supplied from the gas source; and a mechanism, coupled to the shafts, for applying driving torque to the fuel pump during application of pressurized gas to the combustor from the output or drive shaft which is rotating at the higher velocity. The mechanism for applying driving torque comprises a first overrunning clutch coupled to the output shaft in one of the input shafts; and a second overrunning clutch coupled to the drive shaft and another of the input shafts. The motor has a rated operating rotational speed in driving the fuel pump in response to the stored pressurized gas which is less than the rotational velocity at which the output shaft drives the fuel pump when the first turbine is producing full output power.

A power generating unit for supplying to an airframe at least emergency power to a load in accordance with the invention includes a pressurized gas source providing pressurized gas containing oxygen to be used in combusting a fuel; a combustor for providing pressurized gas produced by combustion of a mixture of the pressurized gas provided to the combustor by the pressurized gas source and fuel provided to the combustor by a fuel supply; a first turbine driven by pressurized gas produced by the combustor; a gear box driven by the turbine having an output shaft; a pair of input shafts directly connected to a driven element comprising the load for providing an output utilized in operating the turbine in response to rotation of either of the input shafts; a motor which is activated during pressurized gas being supplied from the gas source to the combustor to rotate a drive shaft; and a coupling mechanism, coupled to the shafts, for applying driving torque to the driven element during application of pressurized gas to the combustor from the output or drive shaft which is rotating at a higher velocity. The coupling mechanism comprises a first overrunning clutch coupled to the output shaft and one of the input shafts; and a second overrunning clutch coupled to the drive shaft and another of the input shafts. The motor has a rated operating rotational speed in driving the fuel pump in response to the stored pressurized gas which is less than the rotational velocity at which the output shaft drives the fuel pump when the first turbine is producing full output power. The motor may be an electrical or hydraulic motor.

BEST MODE FOR CARRYING OUT THE INVENTION

Figure 1:
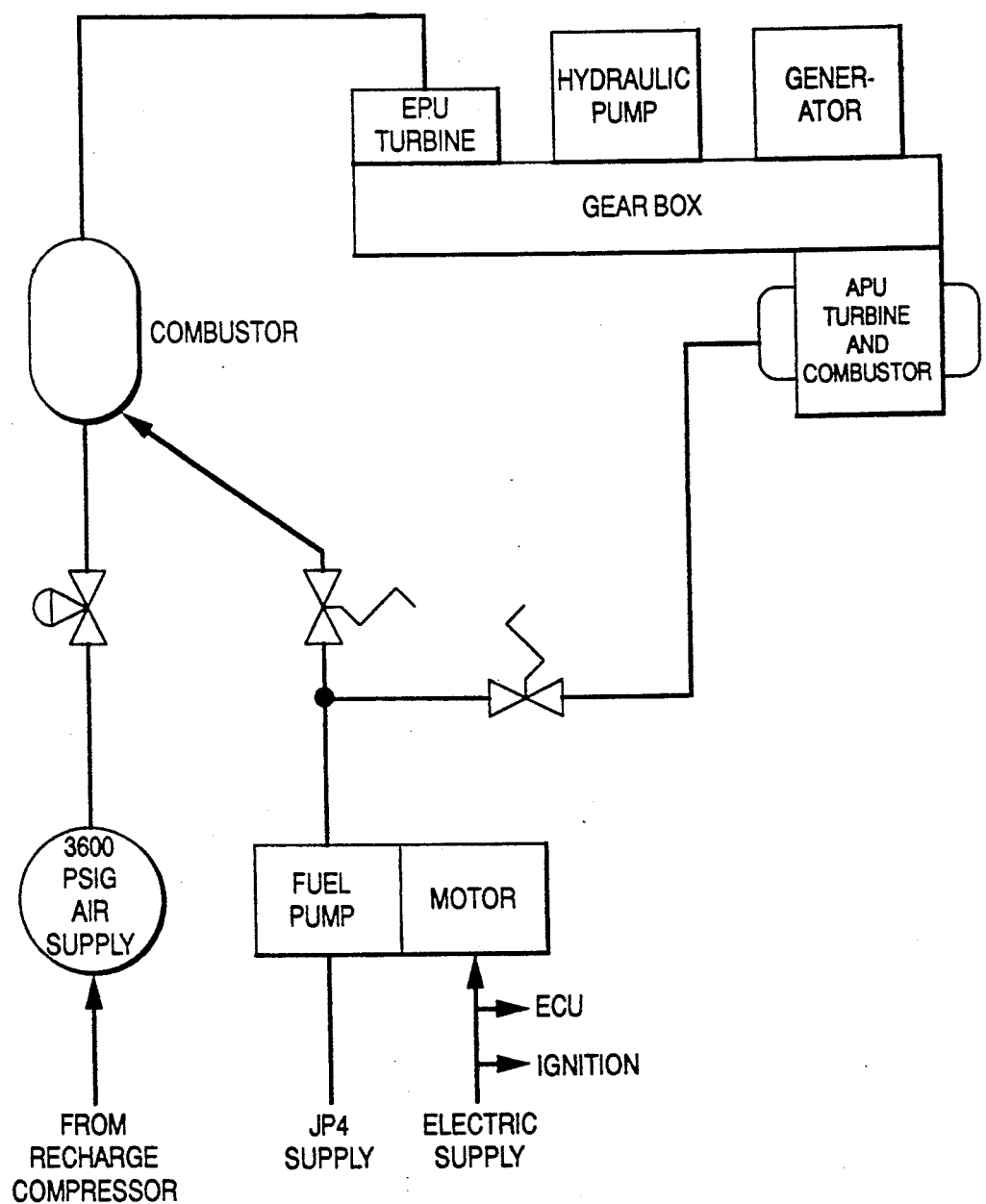
FIG. 1 illustrates a prior art APU/EPU.
Figure 2:
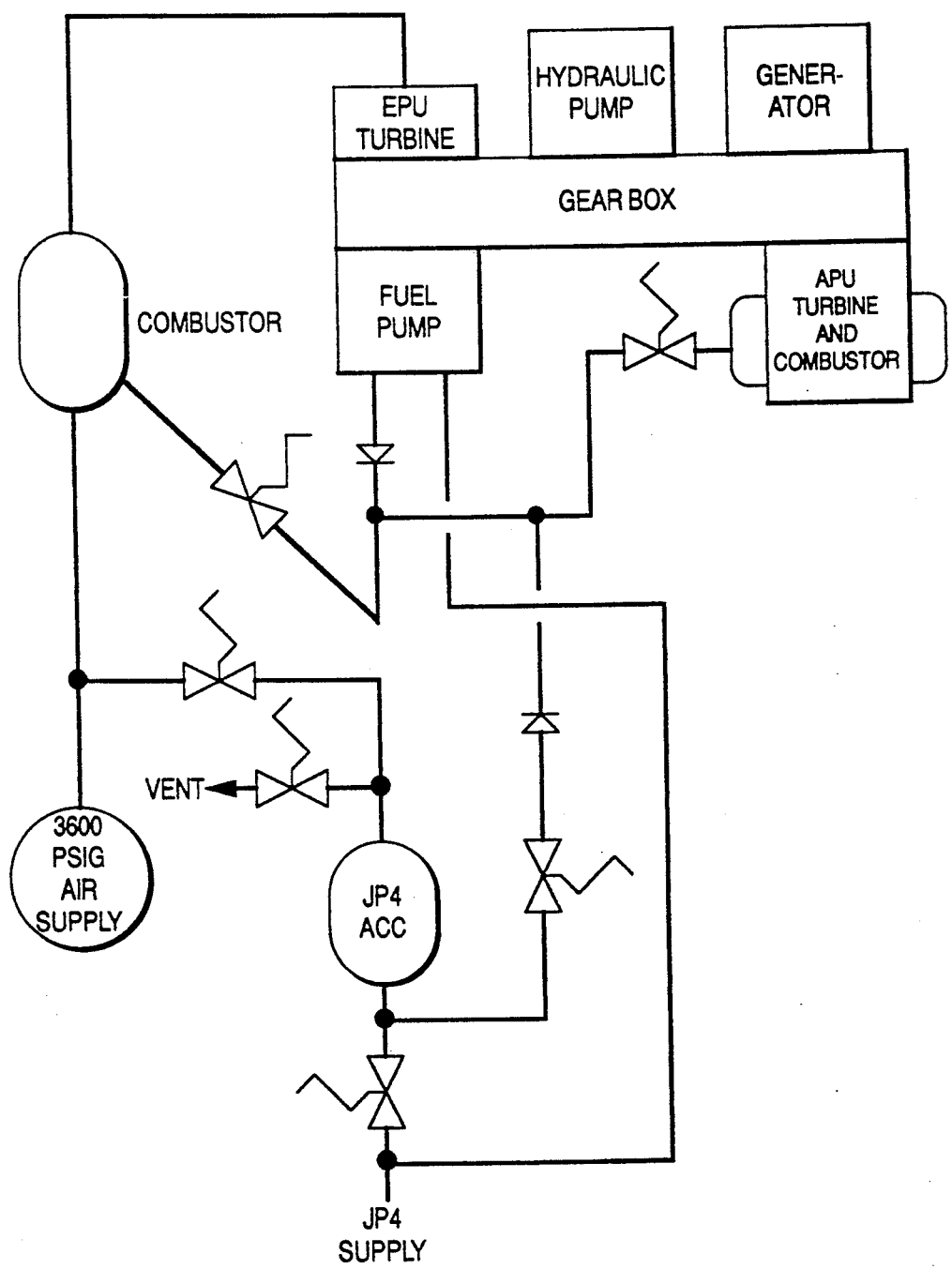
FIG. 2 illustrates a prior art APU/EPU.
Figure 3:
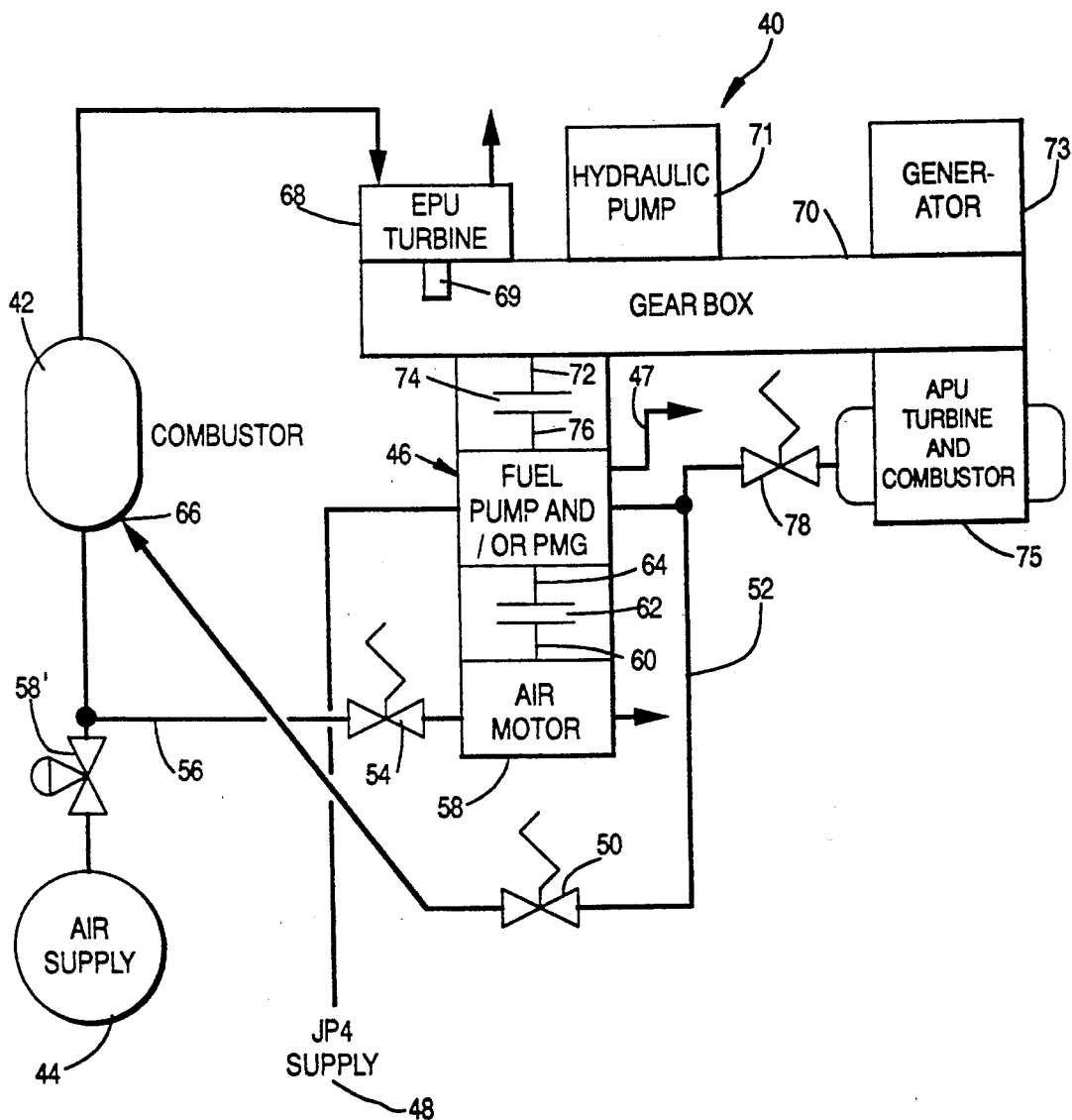
FIG. 3 illustrates a block diagram of a first embodiment of a power generating unit in accordance with the present invention.

FIG. 3 illustrates a block diagram of a first embodiment 40 of an APU/EPU in accordance with the present invention. As illustrated the embodiment 40 may perform either emergency power or auxiliary power generating functions. The emergency power generating function is utilized for providing emergency power to maintain operation of the airframe at altitudes above where the APU may be operated which requires air from the atmosphere for combustion. A combustor 42 combusts a mixture of pressurized air which is blown down from air supply 44 which may store air at a pressure such as 3600 p.s.i. and pressurized fuel which is provided by a fuel pump provided within a driven element 46 which may also contain a permanent magnet generator for providing electrical power outputted on output 47 to an electrical controller (not illustrated) to provide black start capability. Alternatively, the driven element 46 may supply power (electrical, rotary or hydraulic) for operation of the EPU/APU. The fuel pump within the driven element 46 supplies pressurized fuel from a fuel supply 48 storing conventional JP 4 jet fuel after on/off valve 50 disposed in fuel supply line 52 and on/off valve 54 disposed in air supply line 56 have been opened. Initially upon discovery of an emergency condition, the pilot causes the opening of valves 50, 54 and 58' which permits high pressure air stored in air supply 44 to be blown down into the combustor 42 and to supply pressurized air to air motor 58 which supplies torque on output shaft 60 to overrunning clutch 62 which drives a first input shaft 64 of a fuel pump 46 to rapidly supply pressurized fuel to the combustor 42 which is injected by one or more injectors 66. The utilization of air motor 58 to supply a high pressure fuel head rapidly to the injector 66 of combustor 42 is advantageous in that the high energy content present in the air supply 44 produces sufficient torque on the input 64 of the fuel pump 46 to supply the fuel pressure head at the injector 66 necessary to rapidly institute high temperature combustion in the combustor 42. The inclusion of a PMG which is self-excited within the driven element 46 is advantageous in saving weight while providing black start capability. As a consequence of the high rotational speed which is produced by the air motor 58, the PMG may be small in size and lightweight while producing a large enough electrical power output for black start capability. Suitable gearing (not illustrated) may be contained within the driven element 46 to rotate the PMG at a higher rotational velocity than the fuel pump to increase the electrical output of the PMG without a weight penalty. The driven element 46 is not limited to containing either a fuel pump or PMG. The combustor 42 produces pressurized gas which is applied to a EPU turbine 68 having an output shaft 69. The EPU turbine 68 supplies input torque from the output shaft 69 to gear box 70 which has an output 72 which drives an overrunning clutch 74 which drives a second input to the driven element 46. The driven element 46 rotates in response to torque applied from the faster rotating of either input shaft 64 or 76 to drive the fuel pump and PMG.

The air motor 58 has a rated rotational velocity at the supply pressure of the air supply 44 which is less than the rotational velocity of the output shaft 72 when full power combustion is occurring in the combustor 42. Preferably, the top velocity of the output shaft 60 of the air motor at the storage pressure of the air supply which may be a pressure, such as 3600 psi, is approximately 75% of the top velocity of the output 72 during full power combustion occurring in the combustor 42. As a consequence, the overrunning clutch 62 applies full rotational torque without slippage from the air motor to the first input 64 of the driven element 46 up to the point at which the rotational velocity of the output 72 from the gear box 70 reaches the top speed of the air motor. Thereafter, the overrunning clutch 74 applies full torque without slippage from the gear box 70 to the driven element 46 to drive the fuel pump to provide high pressure fuel to the injector 66 of the combustor 42 during the operation of the emergency power generating function.

The APU function of the embodiment 40 of the present invention is implemented in a conventional fashion except that torque from the output from the turbine of the APU turbine and combustor 75 is coupled through the gear box to the output 72 of the gear box to supply torque to the driven element 46 for providing pressurized fuel to the combustor associated with the APU. The on/off fuel control valve 78 is opened during operation of the auxiliary power generating function and is closed during the emergency power generating function. It should be noted that the on/off valve 50 is always maintained in an open or closed state which is opposite to the open or closed state of the on/off valve 78 to avoid supplying pressurized fuel to the combustors associated with the EPU and the APU at the same time.

Figure 4:
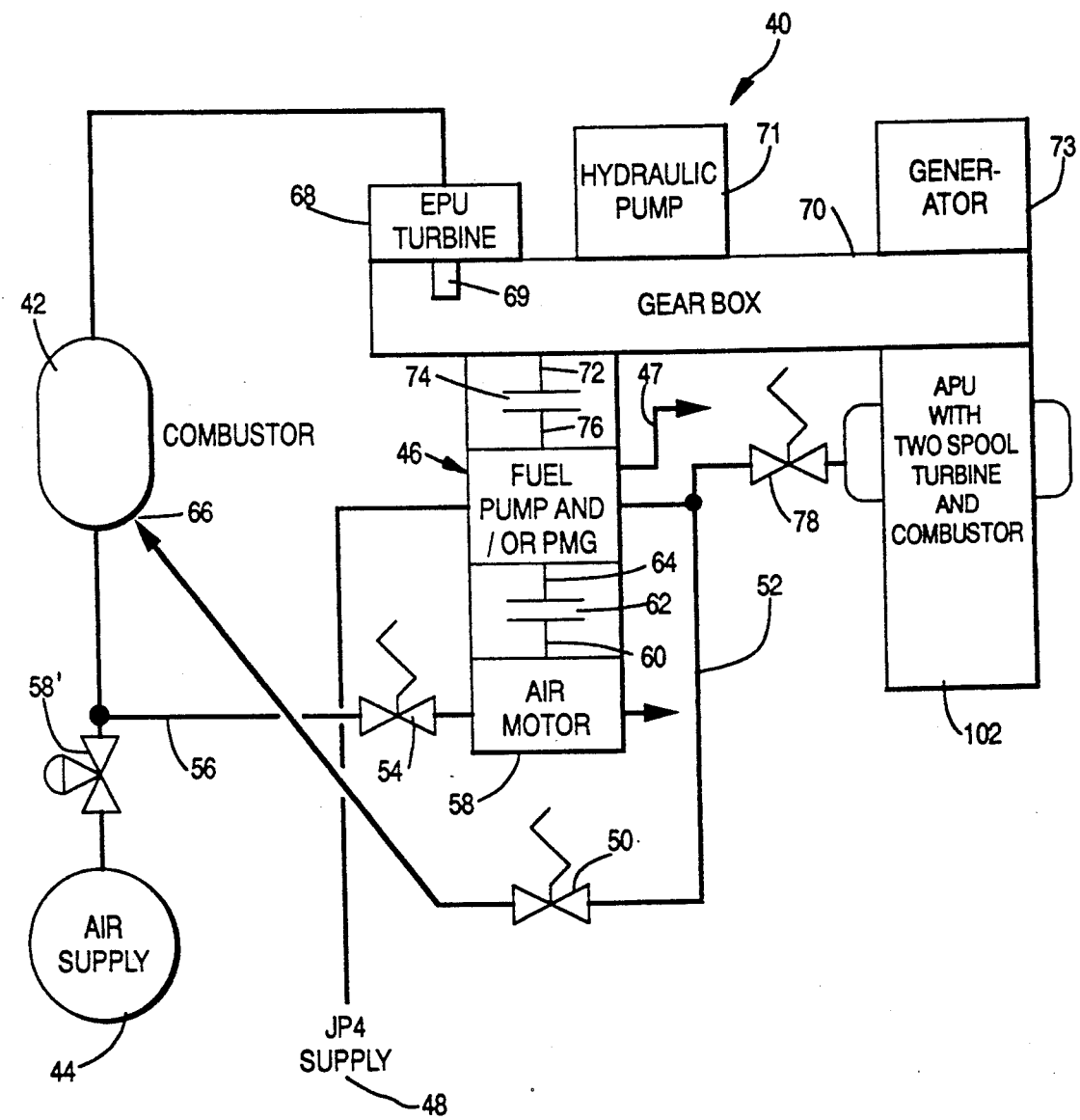
FIG. 4 illustrates a block diagram of a second embodiment of a power generating unit in accordance with the present invention.

FIG. 4 illustrates a second embodiment 100 of the present invention. Like reference numerals identify like parts in FIGS. 3 and 4. The embodiment 100 of FIG. 4 differs from the embodiment 40 of FIG. 3 in that a two shaft or split shaft turbine 102 is contained in the APU. The fuel pump of the driven element 46 supplies pressurized fuel for starting from air motor 58 and for operation through a drive coupling from the low pressure spool of the two shaft turbine or the power spool of the split shaft turbine through the gear box 70. The driven element 46 eliminates the gear drive of the gas generator of the split shaft turbine or the gear drive from the high pressure spool of the two shaft turbine thus saving weight.

While the invention has been described with overrunning clutches for selectively coupling output torque from the air motor 58 or the output 72 of the gear box to the fuel pump 46, it should be understood that the invention may be practiced with other mechanisms or mechanical equivalents of overrunning clutches which selectively function to couple the output shaft 60 of the air motor to the input 64 of the fuel pump 46 until the velocity of the output 72 of the gear box exceeds that of the output shaft 60 of the air motor. The invention may be practiced with any mechanical, electromechanical or electrical coupling mechanism which provides the aforementioned selective application of torque to the inputs 64 and 76 of the fuel pump 46.

Furthermore, it should be noted that when the present invention is operating in generating emergency power, electrical and/or hydraulic power is generated by coupling output torque from the EPU turbine 68 to electrical 71 and/or hydraulic power generators 73 associated with the APU through the gear box 70 with the coupling mechanisms such as gear trains not being illustrated.

While the invention has been described in terms of its preferred embodiment, it should be understood that numerous modifications may be made thereto without the parting from the spirit and scope of the invention as described in the appended claims. For example, the air motor 58 may be replaced with a prime mover which provides rapid acceleration such as, but not limited to, an electric or hydraulic motor to drive the input 64 at high speed until the EUP turbine 68 comes up to self-sustaining speed. It is intended that all such modifications fall within the scope of the appended claims.

We claim:

1. A power generating unit for use in an airframe for supplying at least emergency power to a load comprising:
   a pressurized gas source storing pressurized gas containing oxygen to be used in combusting a fuel;
   a combustor for providing pressurized gas produced by combustion of a mixture of the pressurized gas provided to the combustor by the pressurized gas source and fuel provided to the combustor by a fuel supply;
   a first turbine driven by pressurized gas produced by the combustor;
   a gear box driven by the turbine having an output shaft;
   a pair of input shafts directly connected to a fuel pump comprising the load disposed within the fuel supply for providing pressurized fuel to the combustor in response to rotation of either of the input shafts;
   a motor coupled to the pressurized gas source having a drive shaft which rotates in response to pressurized gas applied from the gas source; and
   means, coupled to the output and drive shafts, for applying driving torque to the fuel pump during application of pressurized gas to the combustor from the output or drive shaft, whichever is rotating at a higher velocity.

2. A power generating unit in accordance with claim 1 wherein the means for applying torque comprises:
   a first overrunning clutch coupled to the output shaft and one of the input shafts; and
   a second overrunning clutch coupled to the drive shaft and another of the input shafts.

3. A power generating unit in accordance with claim 1 wherein:
   the motor has a rated operating rotational speed in driving the fuel pump in response to the stored pressurized gas which is less than the rotational velocity at which the output shaft drives the fuel pump when the first turbine is producing full output power.

4. A power generating unit in accordance with claim 2 wherein:
   the motor has a rated operating rotational speed in driving the fuel pump in response to the stored pressurized gas which is less than the rotational velocity at which the output shaft drives the fuel pump when the first turbine is producing full output power.

5. A power generating unit in accordance with claim 1, wherein:
   the first turbine is part of an emergency power unit.

6. A power generating unit in accordance with claim 2 wherein:
   the first turbine is part of an emergency unit.

7. A power generating unit in accordance with claim 3 wherein:
   the first turbine is part of an emergency power unit.

8. A power generating unit in accordance with claim 4, wherein:
   the first turbine is part of an emergency power unit.

9. A power generating unit in accordance with claim 1, wherein:
   the first turbine is part of an emergency power unit; and further comprising
   an auxiliary power unit coupled to the gear box containing a combustor driving a second turbine, the fuel pump being driven through the gear box by the second turbine to provide pressurized fuel to the second turbine during operation of the auxiliary power unit.

10. A power generating unit in accordance with claim 2 wherein:
    the first turbine is part of an emergency power unit; and further comprising an auxiliary power unit coupled to the gear box containing a combustor driving a second turbine, the fuel pump being driven through the gear box by the second turbine to provide pressurized fuel to the second turbine during operation of the auxiliary power unit.

11. A power generating unit in accordance with claim 3 wherein:
the first turbine is part of an emergency power unit; and further comprising
an auxiliary power unit coupled to the gear box containing a combustor driving a second turbine, the fuel pump being driven through the gear box by the second turbine to provide pressurized fuel to the second turbine during operation of the auxiliary power unit.

12. A power generating unit in accordance with claim 4 wherein:
the first turbine is part of an emergency power unit; and further comprising
an auxiliary power unit coupled to the gear box containing a combustor driving a second turbine, the fuel pump being driven through the gear box by the second turbine to provide pressurized fuel to the second turbine during operation of the auxiliary power unit.

13. A power generating unit in accordance with claim 1 wherein the load further comprises:
an electrical generator, driven from the input shaft which is rotating at a higher velocity by the means for applying driving torque, for providing electrical power for use in starting the turbine.

14. A power generating unit in accordance with claim 2 wherein the load further comprises:
a self-excited electrical generator, driven from the input shaft which is rotating at a higher velocity by the means for applying driving torque, for providing electrical power for use in starting the turbine.

15. A power generating unit in accordance with claim 3 the load further comprises:
a self-excited electrical generator, driven from the input shaft which is rotating at a higher velocity by the means for applying driving torque, for providing electrical power for use in starting the turbine.

16. A power generating unit in accordance with claim 4 the load further comprises:
a self-excited electrical generator, driven from the input shaft which is rotating at a higher velocity by the means for applying driving torque, for providing electrical power for use in starting the turbine.

17. A power generating unit in accordance with claim 5 wherein:
the gear box is coupled to a power generator.

18. A power generating unit in accordance with claim 17, wherein:
the power generator generates electrical power.

19. A power generating unit in accordance with claim 17, wherein:
the power generator generates hydraulic power.

20. A power generating unit in accordance with claim 17, wherein:
the power generator generates electrical and hydraulic power.

21. A power generating unit for use in an airframe for supplying at least emergency power to a load comprising:
a pressurized gas source storing pressurized gas containing oxygen to be used in combusting a fuel;
a combustor for providing pressurized gas produced by combustion of a mixture of the pressurized gas provided to the combustor by the pressurized gas source and fuel provided to the combustor by a fuel supply;
a first turbine driven by pressurized gas produced by the combustor;
a gear box driven by the turbine having an output shaft;
a pair of input shafts directly connected to a fuel pump and a self-excited electrical generator comprising the load for providing an output utilized in operation of the turbine in response to rotation of either of the input shafts;
a motor coupled to the pressurized gas source having a drive shaft which rotates in response to pressurized gas applied from the gas source; and
means, coupled to the output and drive shafts, for applying driving torque to the driven element during application of pressurized gas to the combustor from the output or drive shaft, whichever is rotating at a higher velocity.

22. A power generating unit in accordance with claim 21 wherein the means for applying torque comprises:
a first overrunning clutch coupled to the output shaft and one of the input shafts; and
a second overrunning clutch coupled to the drive shaft and another of the input shafts.

23. A power generating unit in accordance with claim 21 wherein:
the motor has a rated operating rotational speed in driving the driven element in response to the stored pressurized gas which is less than the rotational velocity at which the output shaft drives the driven element when the first turbine is producing full output power.

24. A power generating unit in accordance with claim 22 wherein:
the motor has a rated operating rotational speed in driving the driven element in response to the stored pressurized gas which is less than the rotational velocity at which the output shaft drives the driven element when the first turbine is producing full output power.

25. A power generating unit for use in an airframe for supplying at least emergency power to a load comprising:
a pressurized gas source storing pressurized gas containing oxygen to be used in combusting a fuel;
a combustor for providing pressurized gas produced by combustion of a mixture of the pressurized gas provided to the combustor by the pressurized gas source and fuel provided to the combustor by a fuel supply;
a first turbine driven by pressurized gas produced by the combustor;
a gear box driven by the turbine having an output shaft;
a pair of input shafts directly connected to a self-excited electrical generator comprising the load for providing electrical power in response to rotation of either of the input shafts for use in starting the turbine;
a motor coupled to the pressurized gas source having a drive shaft which rotates in response to pressurized gas applied from the gas source; and
means, coupled to the output and drive shafts, for applying driving torque to the generator during application of pressurized gas to the combustor from the output or drive shaft, whichever is rotating at a higher velocity.

26. A power generating unit in accordance with claim 25 wherein the means for applying torque comprises:
a first overrunning clutch coupled to the output shaft and one of the input shafts; and
a second overrunning clutch coupled to the drive shaft and another of the input shafts; and wherein
the electrical power generator is a permanent magnet generator.

27. A power generating unit in accordance with claim 25 wherein:
the motor has a rated operating rotational speed in driving the electrical generator in response to the stored pressurized gas which is less than the rotational velocity at which the output shaft drives the electrical generator when the first turbine is producing full output power.

28. A power generating unit in accordance with claim 26 wherein:
the motor has a rated operating rotational speed in driving the electrical generator in response to the stored pressurized gas which is less than the rotational velocity at which the output shaft drives the electrical generator when the first turbine is producing full output power.

29. A power generating unit for use in an airframe for supplying at least emergency power to a load comprising:
a pressurized gas source storing pressurized gas containing oxygen to be used in combusting a fuel;
a combustor for providing pressurized gas produced by combustion of a mixture of the pressurized gas provided to the combustor by the pressurized gas source and fuel provided to the combustor by a fuel supply;
a first turbine driven by pressurized gas produced by the combustor;
a gear box driven by the turbine having an output shaft;
a pair of input shafts directly connected to a driven element comprising the load for providing an output utilized in operating the turbine in response to rotation of either of the input shafts;
a motor which is activated during pressurized gas being supplied from the gas source to the combustor to rotate a drive shaft; and
means, coupled to the output and drive shafts, for applying driving torque to the driven element during application of pressurized gas to the combustor from the output or drive shaft, whichever is rotating at a higher velocity.

30. A power generating unit in accordance with claim 29 wherein the means for applying torque comprises:
a first overrunning clutch coupled to the output shaft and one of the input shafts; and
a second overrunning clutch coupled to the drive shaft and another of the input shafts.

31. A power generating unit in accordance with claim 29 wherein:
the motor has a rated operating rotational speed in driving the fuel pump in response to the stored pressurized gas prior to the combustion not producing full output power which is less than the rotational velocity at which the output shaft drives the fuel pump when the first turbine is producing full output power.

32. A power generating unit in accordance with claim 30 wherein:
the motor has a rated operating rotational speed in driving the fuel pump in response to the stored pressurized gas which is less than the rotational velocity at which the output shaft drives the fuel pump when the first turbine is producing full output power.

* * * * *